(12) United States Patent
Lee

(10) Patent No.: US 11,261,124 B2
(45) Date of Patent: Mar. 1, 2022

(54) ENAMEL COMPOSITION AND METHOD OF PREPARING THE SAME

(71) Applicant: LG ELECTRONICS INC., Seoul (KR)

(72) Inventor: Hyeyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 16/666,979

(22) Filed: Oct. 29, 2019

(65) Prior Publication Data

US 2020/0131078 A1    Apr. 30, 2020

(30) Foreign Application Priority Data

Oct. 31, 2018 (KP) .................. 10-2018-0132225

(51) Int. Cl.

| | | |
|---|---|---|
| *C03C 8/14* | (2006.01) | |
| *B01J 23/88* | (2006.01) | |
| *C03C 8/20* | (2006.01) | |
| *B01J 21/06* | (2006.01) | |
| *B01J 21/08* | (2006.01) | |
| *B01J 23/72* | (2006.01) | |
| *B01J 23/745* | (2006.01) | |
| *B01J 23/80* | (2006.01) | |
| *B01J 23/847* | (2006.01) | |
| *B01J 23/885* | (2006.01) | |

(Continued)

(52) U.S. Cl.
CPC .............. *C03C 8/20* (2013.01); *B01J 21/066* (2013.01); *B01J 21/08* (2013.01); *B01J 23/31* (2013.01); *B01J 23/72* (2013.01); *B01J 23/745* (2013.01); *B01J 23/80* (2013.01); *B01J 23/8472* (2013.01); *B01J 23/885* (2013.01); *B01J 23/888* (2013.01); *C03C 8/02* (2013.01)

(58) Field of Classification Search
CPC .................... C03C 8/14; C03C 8/20
See application file for complete search history.

(56) References Cited

U.S. PATENT DOCUMENTS

| 3,547,098 A | 12/1970 | Lee |
|---|---|---|
| 3,718,498 A | 2/1973 | Denny et al. |

(Continued)

FOREIGN PATENT DOCUMENTS

| AU | 2370367 | 1/1969 |
|---|---|---|
| BG | 98027 | 3/1994 |

(Continued)

OTHER PUBLICATIONS

European Search Report dated Mar. 24, 2020 issued in EP Application No. 19207979.6.

(Continued)

*Primary Examiner* — Karl E Group
(74) *Attorney, Agent, or Firm* — Ked & Associates, LLP

(57) ABSTRACT

An enamel composition having improved cleaning performance, a method of preparing the enamel composition, and a cooking device having the enamel composition are disclosed. The enamel composition includes glass frit and a metal oxide catalyst, wherein the metal oxide catalyst includes at least one of a unary metal oxide or a binary metal oxide, thereby allowing cleaning at room temperature while exhibiting good fouling resistance to allow easy removal of oil contaminants, such as chicken fat.

15 Claims, 3 Drawing Sheets

(51) Int. Cl.
*B01J 23/888* (2006.01)
*B01J 23/31* (2006.01)
*C03C 8/02* (2006.01)

(56) References Cited

U.S. PATENT DOCUMENTS

| | | | |
|---|---|---|---|
| 4,084,975 A | 4/1978 | Faust | |
| 4,147,835 A * | 4/1979 | Nishino | A47J 36/02 |
| | | | 126/19 R |
| 4,180,482 A | 12/1979 | Nishino et al. | |
| 4,460,630 A | 7/1984 | Nishino et al. | |
| 4,515,862 A * | 5/1985 | Maki | B01J 23/02 |
| | | | 126/19 R |
| 4,877,758 A | 10/1989 | Lee et al. | |
| 5,650,364 A | 7/1997 | Münstedt et al. | |
| 5,747,395 A | 5/1998 | Smith et al. | |
| 6,123,874 A | 9/2000 | Fukaya et al. | |
| 6,321,569 B1 | 11/2001 | Sreeram et al. | |
| 6,429,161 B1 | 8/2002 | Souchard et al. | |
| 6,566,289 B2 * | 5/2003 | Aronica | C03C 8/08 |
| | | | 501/11 |
| 7,763,557 B2 * | 7/2010 | Baldwin | C03C 8/22 |
| | | | 501/14 |
| 2003/0119647 A1 | 6/2003 | Sanichi et al. | |
| 2003/0187118 A1 | 10/2003 | Aronica et al. | |
| 2004/0043053 A1 | 3/2004 | Yu et al. | |
| 2004/0069764 A1 | 4/2004 | Imai et al. | |
| 2005/0148722 A1 | 7/2005 | Aronica et al. | |
| 2008/0044488 A1 | 2/2008 | Zimmer et al. | |
| 2009/0311514 A1 | 12/2009 | Shon et al. | |
| 2010/0009837 A1 | 1/2010 | Sakoske | |
| 2010/0264126 A1 | 10/2010 | Baek et al. | |
| 2011/0011423 A1 | 1/2011 | Baek et al. | |
| 2011/0049122 A1 | 3/2011 | Baek et al. | |
| 2011/0174826 A1 | 7/2011 | Le Bris et al. | |
| 2011/0262758 A1 | 10/2011 | Benford, Jr. et al. | |
| 2011/0277505 A1 | 11/2011 | Sakoske | |
| 2013/0149444 A1 | 6/2013 | Le Bris et al. | |
| 2013/0299482 A1 | 11/2013 | Kim et al. | |
| 2013/0299484 A1 | 11/2013 | Lee et al. | |
| 2015/0083109 A1 | 3/2015 | Baek et al. | |
| 2018/0170797 A1 | 6/2018 | Gorecki et al. | |
| 2018/0215654 A1 | 8/2018 | Choi et al. | |
| 2018/0215655 A1 | 8/2018 | Kim et al. | |
| 2019/0002336 A1 | 1/2019 | Kim et al. | |
| 2019/0092680 A1 * | 3/2019 | Kim | C03C 3/066 |
| 2019/0337837 A1 | 11/2019 | Kim et al. | |
| 2020/0115274 A1 | 4/2020 | Awagakubo et al. | |
| 2020/0148583 A1 | 5/2020 | Choi et al. | |
| 2020/0270167 A1 | 8/2020 | Choi et al. | |
| 2020/0270168 A1 | 8/2020 | Choi et al. | |
| 2020/0270171 A1 | 8/2020 | Gwoo | |

FOREIGN PATENT DOCUMENTS

| | | | | |
|---|---|---|---|---|
| CN | 1042890 | 6/1990 | | |
| CN | 1105343 | 7/1995 | | |
| CN | 1108626 | 9/1995 | | |
| CN | 1176942 | 3/1998 | | |
| CN | 1487240 | 4/2004 | | |
| CN | 101067207 | 11/2007 | | |
| CN | 101094818 | 12/2007 | | |
| CN | 101182119 | 5/2008 | | |
| CN | 101519276 | 9/2009 | | |
| CN | 101734858 | 6/2010 | | |
| CN | 102066011 | 5/2011 | | |
| CN | 102089253 | 6/2011 | | |
| CN | 102219383 | 10/2011 | | |
| CN | 102368933 | 3/2012 | | |
| CN | 102422085 | 4/2012 | | |
| CN | 104891805 | 9/2015 | | |
| CN | 105621889 | 6/2016 | | |
| CN | 106957149 | 7/2017 | | |
| CN | 107513747 | 12/2017 | | |
| CN | 108059341 | 5/2018 | | |
| CN | 108675636 | 10/2018 | | |
| EP | 0 086 109 | 8/1983 | | |
| EP | 0 453 897 | 10/1991 | | |
| EP | 0 565 941 | 10/1993 | | |
| EP | 1 160 283 | 12/2001 | | |
| EP | 1 256 556 | 11/2002 | | |
| EP | 1 298 099 | 4/2003 | | |
| EP | 2 662 341 | 11/2013 | | |
| EP | 3 357 877 | 8/2018 | | |
| EP | 3 459 914 | 3/2019 | | |
| EP | 3 578 525 | 12/2019 | | |
| EP | 3 650 414 | 5/2020 | | |
| GB | 1 214 261 | 12/1970 | | |
| HU | 01 00796 | 8/2002 | | |
| JP | 54153819 A * | 0/0000 | | |
| JP | 2004269322 A * | 0/0000 | | C03C 3/085 |
| JP | S54-77618 | 6/1979 | | |
| JP | S54-106529 | 8/1979 | | |
| JP | S55-75740 | 6/1980 | | |
| JP | S56-78450 | 6/1981 | | |
| JP | S63-230537 | 9/1988 | | |
| JP | S63-230538 | 9/1988 | | |
| JP | 2001-080935 | 3/2001 | | |
| JP | 2001-303276 | 10/2001 | | |
| JP | 2002-367510 | 12/2002 | | |
| JP | 2003-206417 | 7/2003 | | |
| JP | 2004-358846 | 12/2004 | | |
| JP | 2005-008974 | 1/2005 | | |
| JP | 2014-148465 | 8/2014 | | |
| JP | 2014-221937 | 11/2014 | | |
| JP | 2016-030849 | 3/2016 | | |
| KR | 10-2011-0023079 | 3/2011 | | |
| KR | 10-2013-0125910 | 11/2013 | | |
| KR | 10-2013-0125918 | 11/2013 | | |
| KR | 10-2014-0014658 | 2/2014 | | |
| KR | 10-2014-0115562 | 10/2014 | | |
| KR | 10-1476501 | 12/2014 | | |
| KR | 10-2018-0089986 | 8/2018 | | |
| KR | 10-2018-0089988 | 8/2018 | | |
| RU | 2007112383 | 10/2008 | | |
| WO | WO 95/09131 | 4/1995 | | |
| WO | WO 01/92413 | 12/2001 | | |
| WO | WO 02/02471 | 1/2002 | | |
| WO | WO 03/008354 | 1/2003 | | |
| WO | WO 2018/143704 | 8/2018 | | |
| WO | WO 2018/198986 | 11/2018 | | |
| WO | WO 2019/203565 | 10/2019 | | |

OTHER PUBLICATIONS

Korean Office Action dated May 8, 2020 issued in KR Application No. 10-2019-0021139.
Korean Office Action dated May 11, 2020 issued in KR Application No. 10-2019-0021140.
Korean Office Action dated May 11, 2020 issued in KR Application No. 10-2019-0021141.
Korean Office Action dated May 12, 2020 issued in KR Application No. 10-2019-0021142.
Korean Office Action dated May 13, 2020 issued in KR Application No. 10-2019-0021143.
Korean Office Action dated May 13, 2020 issued in KR Application No. 10-2019-0021144.
Korean Office Action dated May 13, 2020 issued in KR Application No. 10-2019-0021145.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.

(56) References Cited

OTHER PUBLICATIONS

European Search Report dated Jul. 22, 2020 issued in EP Application No. 20158690.6.
Korean Notice of Allowance dated Jul. 27, 2020 issued in KR Application No. 10-2019-0021140.
Korean Notice of Allowance dated Jul. 27, 2020 issued in KR Application No. 10-2019-0021144.
Korean Notice of Allowance dated Jul. 27, 2020 issued in KR Application No. 10-2019-0021145.
Korean Notice of Allowance dated Jul. 29, 2020 issued in KR Application No. 10-2019-0021141.
Korean Notice of Allowance dated Jul. 30, 2020 issued in KR Application No. 10-2019-0021143.
European Search Report dated Mar. 24, 2020 issued in EP Application No. 19205924.4.
U.S. Appl. No. 16/666,979, filed Oct. 29, 2019.
U.S. Appl. No. 16/676,903, filed Nov. 7, 2019.
U.S. Appl. No. 16/795,923, filed Feb. 20, 2020.
U.S. Appl. No. 16/795,959, filed Feb. 20, 2020.
U.S. Appl. No. 16/796,066, filed Feb. 20, 2020.
U.S. Appl. No. 16/796,052, filed Feb. 20, 2020.
U.S. Appl. No. 16/796,075, filed Feb. 20, 2020.
U.S. Appl. No. 16/796,102, filed Feb. 20, 2020.
U.S. Appl. No. 16/796,127, filed Feb. 20, 2020.
United States Office Action dated Apr. 6, 2021 issued in co-pending related U.S. Appl. No. 16/676,903.
Chinese Office Action dated Jul. 26, 2021 issued in CN Application No. 1911042287.3 .
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
U.S. Notice of Allowance dated Nov. 23, 2021 issued in U.S. Appl. No. 16/795,923.

\* cited by examiner

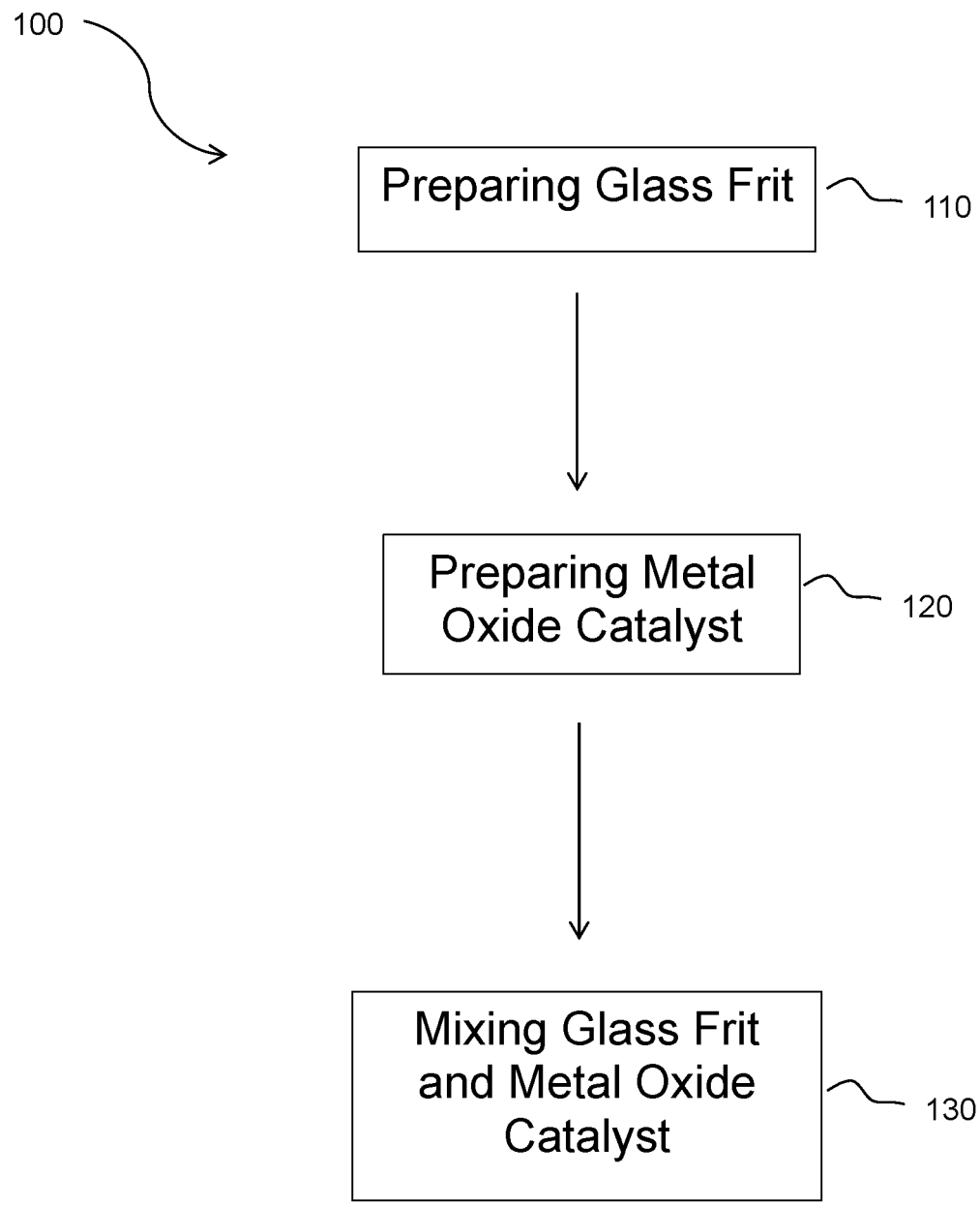

ENAMEL COMPOSITION AND METHOD OF PREPARING THE SAME

CROSS-REFERENCE TO RELATED APPLICATION

This application claims priority under 35 U.S.C. § 119 to Korean Application No. 10-2018-0132225 filed on Oct. 31, 2018, whose entire disclosure is hereby incorporated by reference.

BACKGROUND

1. Field

An enamel composition for cooking devices and a method of preparing the same are disclosed.

2. Background

Enamel may be formed by applying a glass enamel substance to a surface of a metal plate. Enamel is used in cooking devices, such as an oven. A cooking device, such as an oven, may generally refer to a device for cooking food using heat from at least one heating source.

Since contaminants generated during cooking may adhere to an inner wall of a cavity of the cooking device, the inner wall of the cavity may be routinely cleaned to remove the contaminants. For example, food cooking at relatively high temperature may cause the inner wall of the cavity to be exposed to organic materials and alkali components. Accordingly, a technology for coating an inner wall of a cavity of a cooking device with an enamel composition has been developed to allow for relatively easy cleaning of the inner wall of the cavity. For example, an enamel composition allowing for cleaning of oil contaminants, such as cooking oil or meat fat, in a temperature range of 60° C. to 90° C. for 10 to 15 minutes is known. However, this enamel composition may still require a relatively high temperature range for cleaning and has a problem that certain oily contaminants, particularly oil containing a large amount of unsaturated fatty acids such as chicken fat, are still difficult to remove even at the elevated temperature range.

Therefore, there is a need for an enamel composition that enables improved cleaning at room temperature to allow for easier cleaning and has good fouling resistance to allow for relatively easy removal of oil contaminants, such as chicken fat. In addition, there is a need for an enamel composition that can optimize cleaning performance at the lowest costs through use of inexpensive raw materials for improvement of cleaning performance of the enamel composition. Furthermore, there is a need for a method of preparing an enamel composition that can exhibit cleaning performance that allows easy removal of contaminants without heating the chamber to relatively high temperatures and that optimizes cleaning performance at relatively lowest costs.

BRIEF DESCRIPTION OF THE DRAWINGS

The embodiments will be described in detail with reference to the following drawings in which like reference numerals refer to like elements wherein:

FIG. 4 is a flow diagram illustrating a method for preparing an enamel composition according to one exemplary embodiment of the present disclosure.

DETAILED DESCRIPTION

Figure 1:
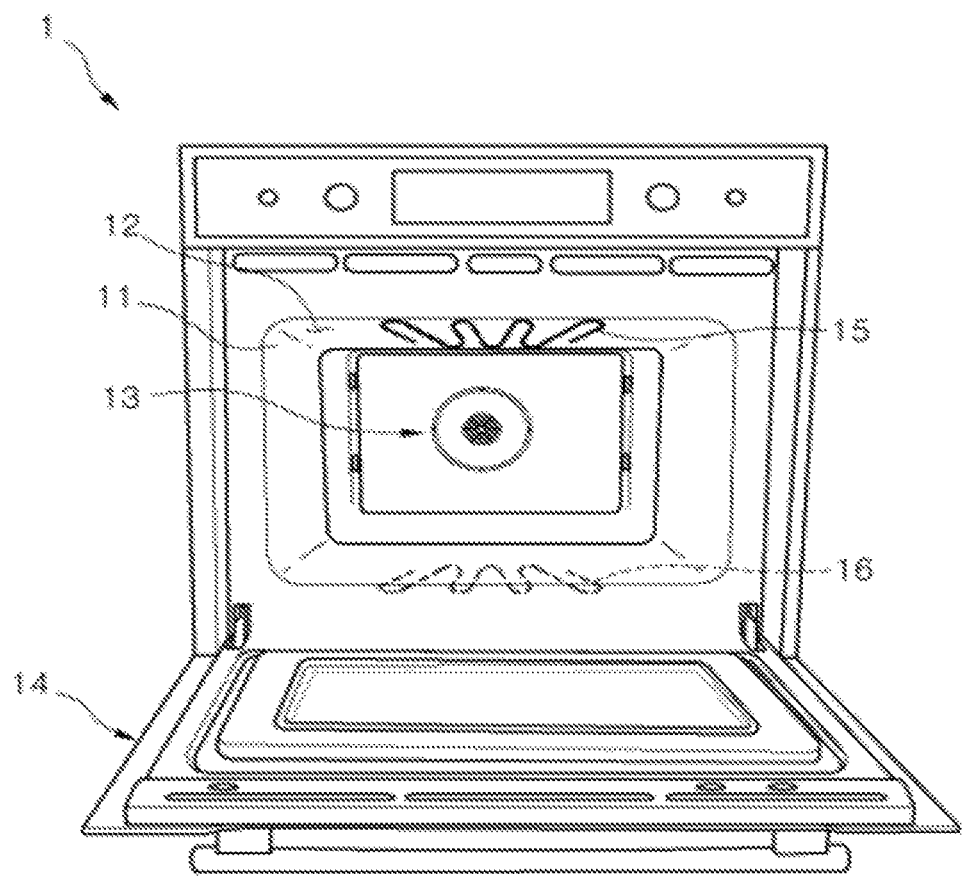
FIG. 1 is a front view of a cooking device according to one exemplary embodiment of the present disclosure.

An enamel composition according to an example of the present disclosure is now described. For example, the enamel composition may include glass frit and a metal oxide catalyst that includes at least one of a unary metal oxide (also referred to as a single-component metal oxide) or a binary metal oxide. In certain examples, the enamel composition according to the present disclosure may include a composition in which glass frit prepared from a glass frit material is mixed with a separate metal oxide catalyst.

Various kinds of conventional enamel compositions, particularly enamel compositions for the interior of a cooking device, are known in the relevant technical art. However, a conventional enamel composition may allow for cleaning at, for example, a temperature condition of at least 60° C. to 90° C. and a cleaning time of about 10 min to about 15 min. Conversely, an enamel composition composed of a mixture of glass frit and a metal oxide catalyst, in accordance with certain implementations as described in greater detail below, enable cleaning at room temperature (e.g., at about 15° C. to 25° C.) with a cleaning time of about 10 min.

In addition, a conventional enamel composition may have a problem that the conventional enamel composition may not allow complete removal of certain oil contaminants, particularly chicken fat. Chicken fat contains a large amount of unsaturated fatty acid having a number of double bonds and is likely to adhere to an enamel coating surface on which the enamel composition is coated. Accordingly, it is very difficult to remove the chicken fat from the coating surface upon cleaning the coating surface. However, the metal oxide catalyst included in the enamel composition according to the present disclosure can lift oil contaminants such as chicken fat from the coating surface. As a result, the enamel composition which contains the metal oxide catalyst, according to aspects of the present disclosure, may allow for easier removal of chicken fat components in comparison to existing enamel compositions.

As previously described, the metal oxide catalyst used in the enamel composition may include at least one of a unary metal oxide or a binary metal oxide. These metal oxides may be provided in powder form. Although the unary metal oxide may be selected from any unary metal oxides having a function of a catalyst capable of imparting cleaning performance to the enamel composition without limitation, the unary metal oxide according to the present disclosure may include at least one selected from the group of $Bi_2O_3$, $TiO_2$, $V_2O_5$, MnO, $Fe_2O_3$, CuO, ZnO, $WO_3$, and $MoO_3$. As described above, the metal oxide provided in powder form may be mixed with the glass frit.

Similarly, although the binary metal oxide may be selected from any binary metal oxides having a function of a catalyst capable of imparting cleaning performance to the enamel composition without limitation, the binary metal oxide according to the present disclosure may include an alloy metal oxide of two metal oxides selected from the group of $Bi_2O_3$, $TiO_2$, $V_2O_5$, MnO, $Fe_2O_3$, CuO, ZnO, $WO_3$, and $MoO_3$. According to certain examples of the present disclosure, a Cu—Mo alloy metal oxide or a Bi—Mo alloy metal oxide, which contains molybdenum (Mo) capable of imparting a relatively good anti-fouling function to the enamel composition, may be used.

According to aspects of the present disclosure, the enamel composition may include glass frit. The glass frit may be prepared by burning glass frit materials, which contain various components constituting glass, followed by cooling of the glass frit materials. According to the present disclosure, the components of the glass frit include any components typically used in a typical enamel composition, without limitation. Here, in order to impart fundamental properties including fouling resistance to the enamel composition, the glass frit in one example may include 15 wt % to 40 wt % of $SiO_2$, 15 wt % to 40 wt % of $B_2O_3$, 8 wt % to 20 wt % of $Na_2O$, 3 wt % to 10 wt % of, 1 wt % to 3 wt % of $Li_2O$, 15 wt % to 40 wt % of ZnO, 1 wt % to 5 wt % of NaF, 2 wt % to 6 wt % of $Co_3O_4$, and 0.5 wt % to 3 wt % of NiO.

$SiO_2$ is a component forming the glass structure and may provide an effect of improving durability of the enamel composition by strengthening the frame of the glass structure. In the above example, $SiO_2$ may be present in an amount of 15 wt % to 40 wt % in the glass frit. If the content of $SiO_2$ exceeds 40 wt %, $SiO_2$ obstructs addition of other components, causing a problem of deterioration in fundamental properties of the enamel composition. If the content of $SiO_2$ is less than 15 wt %, there can be a problem of disruption of the glass composition.

$B_2O_3$ acts as a glass forming agent to allow each component of the glass frit to be uniformly melted. In addition, $B_2O_3$ may improve coating capability of the enamel composition through regulation of the coefficient of thermal expansion and fusion flow of the enamel composition. $B_2O_3$ is present in an amount of 15 wt % to 40 wt % in the glass frit. If the content of $B_2O_3$ exceeds 40 wt %, B2O3 obstructs addition of other components, causing a problem of deterioration in fundamental properties of the enamel composition. If the content of $B_2O_3$ is less than 15 wt %, there can be a problem of disruption or crystallization of the glass composition.

$Li_2O$, $Na_2O$, and $K_2O$ are Group I-based oxides and may serve to improve the cleaning performance of the enamel composition. $Li_2O$, $Na_2O$, and $K_2O$ may be present in amounts of 1 wt % to 3 wt %, 8 wt % to 20 wt %, and 3 wt % to 10 wt % in the glass frit, respectively. If the content of each of $Li_2O$, $Na_2O$, and $K_2O$ exceeds the upper limit thereof, the enamel composition can suffer from deterioration in thermal properties thereof. If the content of each of $Li_2O$, $Na_2O$, and $K_2O$ is less than the lower limit thereof, there can be a problem of deterioration in cleaning performance of the enamel composition.

In addition, the glass frit according to the present disclosure may contain ZnO, $Co_3O_4$, NiO, and NaF, which may be present in amounts of 15 wt % to 40 wt %, 2 wt % to 6 wt %, 0.5 wt % to 3 wt %, and 1 wt % to 5 wt %, respectively. ZnO, $Co_3O_4$, NiO, and NaF may improve the cleaning performance and surface characteristics of an enamel coating layer. If the content of each of these components exceeds the upper limit thereof, the enamel composition can suffer from deterioration in fusion flow thereof. If the content of each of these components is less than the lower limit thereof, there can be a problem of deterioration in coating capability due to deterioration in surface characteristics of the enamel coating layer.

In addition, it should be understood that the glass frit according to aspects of the present disclosure may further include other components not mentioned above, may omit one or more of the components mentioned above, or may include these or other components in different ratios.

As described above, the enamel composition according to one example of the present disclosure may include the glass frit and the metal oxide catalyst. For example, the enamel composition may include 90 wt % to 98 wt % of the glass frit and 2 wt % to 10 wt % of the metal oxide catalyst.

In certain examples, the metal oxide catalyst may be distributed in the form of particles on the surface of the enamel coating layer. The catalyst particles may contact contaminants adhered to the surface of the enamel coating layer. Accordingly, the enamel coating layer formed of the enamel composition according to examples of the present disclosure may have better cleaning performance in comparison to an enamel coating layer that does not include the catalyst.

The metal oxide catalyst may be present in an amount of 2 wt % to 10 wt % in the enamel composition. If the content of the metal oxide catalyst is less than 2 wt % in the enamel composition, the enamel composition can provide insignificant cleaning performance, and if the content of the metal oxide catalyst exceeds 10 wt %, the enamel composition may suffer from deterioration in coating capability. As such, in the enamel composition according to one example of the present disclosure, the glass frit may be mixed in a suitable ratio at a low end of the range of the content of the metal oxide catalyst (e.g., about 2 wt %), thereby securing good cleaning performance of the enamel composition at relatively low costs.

FIG. 4 depicts a method 100 of preparing an enamel composition according to the present disclosure. The method 100 of preparing the enamel composition may include preparing glass frit (S110); preparing a metal oxide catalyst including at least one selected from the group of a unary metal oxide and a binary metal oxide (S120); and mixing the glass frit with the metal oxide catalyst (S130). As described above, the enamel composition according to the present disclosure means a composition in which glass frit prepared from a glass frit material is mixed with a separate metal oxide catalyst. Since the enamel composition according to the present disclosure may be prepared by mixing the glass frit with the metal oxide catalyst, the enamel composition securing good cleaning performance may be relatively easily prepared.

Preparing the glass frit may include a process of preparing the glass frit using glass frit materials that are main components of the enamel composition. For example, preparing glass frit may include preparing the glass frit materials, followed by melting the glass frit materials; and then quenching the melted glass fit materials to form the glass frit.

As described above, the glass frit materials may be selected from any glass frit materials used in a typical enamel composition, without limitation. Here, in order to impart fundamental properties including fouling resistance to the enamel composition, the glass frit may include the certain compositions of components. For example, the glass frit according to an example of the present disclosure may include 15 wt % to 40 wt % of $SiO_2$, 15 wt % to 40 wt % of $B_2O_3$, 8 wt % to 20 wt % of $Na_2O$, 3 wt % to 10 wt % of $K_2O$, 1 wt % to 3 wt % of $Li_2O$, 15 wt % to 40 wt % of ZnO, 1 wt % to 5 wt % of NaF, 2 wt % to 6 wt % of $Co_3O_4$, and 0.5 wt % to 3 wt % of NiO. The functions and significance of the content of each of these components was described above.

Next, the preparation method according to one example of the present disclosure may include the preparing the metal oxide catalyst including at least one of the unary metal oxide and the binary metal oxide. As described above, the metal oxide catalyst may be prepared in powder form.

As described above, although the unary metal oxide may be selected from any unary metal oxides having a function of a catalyst capable of imparting cleaning performance to the enamel composition without limitation, the unary metal oxide according to the present disclosure may include at least one selected from the group of $Bi_2O_3$, $TiO_2$, $V_2O_5$, MnO, $Fe_2O_3$, CuO, ZnO, $WO_3$, and $MoO_3$.

In addition, although the binary metal oxide may be selected from any binary metal oxides having a function of a catalyst capable of imparting cleaning performance to the enamel composition without limitation, the binary metal oxide according to the present disclosure may include alloys of two metal oxides selected from the group of $Bi_2O_3$, $TiO_2$, $V_2O_5$, MnO, $Fe_2O_3$, CuO, ZnO, $WO_3$, and $MoO_3$. In addition, the binary metal oxide may be prepared by selecting two metal oxides from the group of $Bi_2O_3$, $TiO_2$, $V_2O_5$, MnO, $Fe_2O_3$, CuO, ZnO, $WO_3$, and $MoO_3$, and burning the two metal oxides at a temperature of 500° C. to 1500° C., followed by cooling.

According to one example, a Cu—Mo alloy metal oxide or a Bi—Mo alloy metal oxide, which contains molybdenum (Mo) capable of imparting a relatively good anti-fouling function to the enamel composition, may be used as the metal oxide.

Next, the preparation method according to an example of the present disclosure includes mixing the glass frit and with metal oxide catalyst. The mixing of the glass frit with the metal oxide catalyst may be performed by any method without limitation. In one example, the enamel composition is prepared by mixing 90 wt % to 98 wt % of the glass frit with 2 wt % to 10 wt % of the metal oxide catalyst. The significance of the content of each component is described above.

Next, a cooking device according to an example of the present application is now described. For example, the enamel composition according to the present disclosure may be coated on one surface of a target, such as a cavity of a cooking device. The target may include a metal plate, a glass plate, or a portion or the entirety of a cooking device. Preferably, the enamel composition is coated on an inner surface of a cavity of the cooking device or on an inner surface of a door of the cooking device.

Referring to FIG. 1, a cooking device 1 according to the present disclosure may include a cavity 11 defining a cooking chamber, a door 14 selectively opening/closing the cooking chamber, at least one heating source 13, 15, 16 supplying heat for heating food in the cooking chamber, and a coating layer 17, 18 formed by coating the enamel composition according to the present disclosure on an inner surface of the cavity 11 or an inner surface of the door 14.

The cavity 11 may have a hexahedral (e.g., rectangular box) shape open at a front side thereof. The heating source 13, 15, 16 may include a convection assembly 13 adapted to allow heated air to be supplied into the cavity 11, an upper heater 15 disposed at an upper side of the cavity 11, and a lower heater 16 disposed at a lower side of the cavity 11. The upper heater 15 and the lower heater 16 may be disposed inside or outside the cavity 11. The heating source 13, 15, 16 may omit one or more of the convection assembly 13, the upper heater 15, or the lower heater 16. That is, the heating source 13, 15, 16 may include at least one selected from the group of the convection assembly 13, the upper heater 15, and the lower heater 16.

Figure 2:
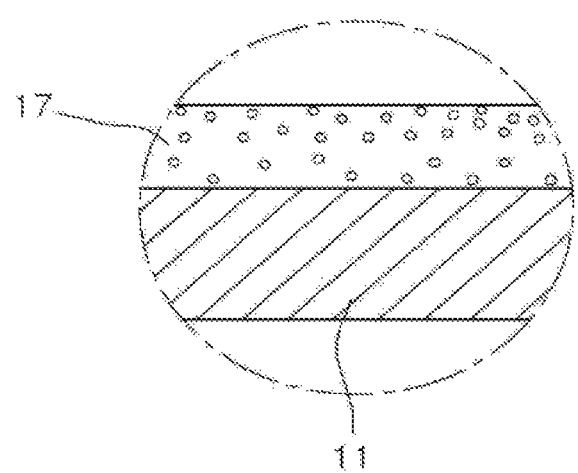
FIG. 2 is an enlarged cross-sectional view of a portion of an inner surface of a cavity of the cooking device shown in FIG. 1.
Figure 3:
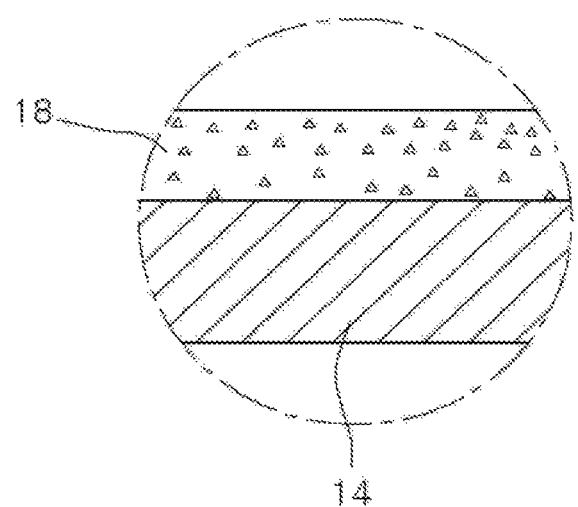
FIG. 3 is an enlarged cross-sectional view of a portion of an inner surface of a door of the cooking device shown in FIG. 1.

Referring to FIG. 2 and FIG. 3, the enamel composition according to the present disclosure may be coated on the inner surface of the cavity 11 or the door 14 of the cooking device 1 by a dry process or a wet process. Each of the cavity 11 and the door 14 may be formed using a metal plate and the coating layer 17 or 18 may be formed in a single layer by coating the enamel composition according to the present disclosure on the metal plate. In certain examples, the composition of coating layer 17 in the cavity may be different from the composition of coating layer 18 on the door 14, such as the coating layer 18 having a different amount (by weight percentage) of metal oxide catalyst and/or a different metal oxide catalyst. In another example, the composition of certain portions of the coating layer 17,18 may be different from the composition of other portions of the coating layer 17,18, such as certain portions having a different amount (by weight percentage) of the metal oxide catalyst or a different metal oxide catalyst, such as to provide improved cleaning performance on certain surfaces where contaminants, such as fat, are more likely to be deposited.

In the dry process, the enamel composition material is dispersed in an organic binder to form a mixture of the enamel composition material and the organic binder, which in turn is milled by a ball mill to form glass frit. On the other hand, in the wet process, the enamel composition material is dispersed in water (H2O) and a pigment to form a mixture of the enamel composition material, water (H2O) and the pigment, which in turn is milled by a ball mill to form glass frit.

Then, the glass frit prepared by the dry process or the wet process may be deposited on the inner surface of the cavity 11 or the door 14 of the cooking device 1 by a spray method. The deposited glass frit may be burnt at a temperature of 600° C. to 900° C. for 100 to 450 seconds to be coated on the inner surface of the cavity 11 or the door 14 of the cooking device 1.

Next, details of the present disclosure will be described with reference to examples. An example of a preparation of the enamel composition is now described. As previously described, the preparation of the enamel composition may include preparation of the glass frit. Glass frit having a composition as listed in Table 1 may be prepared. Raw materials of each component were sufficiently mixed in a V-mixer for 3 hours. The mixture was sufficiently melted at 1,300° C. for 1.5 hours and quenched using a quenching roller, thereby preparing a glass cullet. Then, the prepared glass cullet was subjected to milling for control of an initial particle size by a ball mill, pulverized by a jet mill for about 5 hours, and passed through a 325-mesh sieve (ASTM C285-88) to have a particle diameter of 45 μm or less, thereby preparing glass frit of Preparative Example 1.

TABLE 1

| | Glass frit component | | | | | | | | |
|---|---|---|---|---|---|---|---|---|---|
| | $SiO_2$ | $B_2O_3$ | $Na_2O$ | $K_2O$ | $Li_2O$ | ZnO | NaF | $CO_3O_4$ | NiO |
| Preparative Example 1 | 28.1 | 20.2 | 12.4 | 4.3 | 1.8 | 23.8 | 2.2 | 4.7 | 2.5 |

Preparation of the metal oxide catalyst is now described. For example, metal oxide powder of each of CuO, MoO$_3$, Fe$_2$O$_3$, Bi$_2$O$_3$, and V$_2$O$_5$ may be used to prepare a unary metal oxide catalyst. Then, CuO powder and MoO$_3$ powder were mixed in a weight ratio of 1:1 and burnt at 900° C. for 30 minutes, followed by quenching, thereby preparing a metal oxide catalyst of a Cu—Mo binary alloy. In addition, Bi$_2$O$_3$ powder and MoO$_3$ powder were mixed in a weight ratio of 1:1 and burnt at 900° C. for 30 minutes, followed by quenching, thereby preparing a metal oxide catalyst of a Bi—Mo binary alloy.

Preparation of enamel composition is now described. For example, the glass frit of Preparative Example 1 may be mixed with the metal oxide catalysts to prepare enamel compositions of inventive examples. An enamel composition of the Comparative Example means an enamel composition consisting of the glass frit. Table 2 shows the components of the enamel compositions of the Examples and the Comparative Example.

TABLE 2

| Components of enamel composition | Example | | | | | | | Comparative Example |
|---|---|---|---|---|---|---|---|---|
| | 1 | 2 | 3 | 4 | 5 | 6 | 7 | 1 |
| Glass frit (wt %) | Preparative Example 1 (95) | | | | | | | Preparative Example 1 (100) |
| Catalyst (wt %) | CuO (5) | MoO$_3$ (5) | Fe$_2$O$_3$ (5) | Bi$_2$O$_3$ (5) | V$_2$O$_5$ (5) | Cu—Mo (5) | Bi—Mo (5) | Not present |

An example of the preparation of an enamel composition specimen is now described. For example, 0.9 g of each of the enamel compositions prepared in the Examples 1 to 7 and the Comparative Example 1 may be placed on a low-carbon steel sheet having a size of 200 mm×200 mm×1 mm (length×width×thickness). The sheet may be heated at 750° C. for 300 seconds to prepare a specimen of each enamel composition.

As experimental example according to aspects of the present disclosure are now provided. For example, a cleaning performance may be evaluated on the specimens of the enamel compositions prepared in the Examples and the Comparative Examples by the following method. For evaluation of cleaning performance, each of 1 g chicken fat and 1 g olive oil may be thinly applied as a contaminant to the surface of a specimen, which was prepared by coating the enamel composition on a metal substrate (100 mm×100 mm), using a brush, and the specimen may be left in a constant temperature chamber at 250° C. to 285° C. for 1 hour such that the contaminants were adhered to the specimen.

Then, the specimen was naturally cooled and the degree of curing of each contaminant was checked, followed by wiping the cured contaminants from the specimen using a frying fan-exclusive scrubber moistened with water at room temperature under a force of 3 kgf or less. A bar having a diameter of 5 cm and a flat bottom was used to allow uniform wiping of the contaminants on the surface of the specimen. At this time, the number of reciprocative wiping times was counted and was defined as the number of reciprocation times for cleaning, and the cleaning performance evaluation standards are shown in Table 3. In addition, the cleaning performance of each of the specimens is listed in Table 4.

TABLE 3

| Number of reciprocation times for cleaning | Level |
|---|---|
| 1 to 5 | LV.5 |
| 6 to 15 | LV.4 |
| 16 to 25 | LV.3 |
| 26 to 50 | LV.2 |
| 51 or more | LV.1 |

TABLE 4

| Contaminant (Leaving temperature) | Example | | | | | | | Comparative Example |
|---|---|---|---|---|---|---|---|---|
| | 1 | 2 | 3 | 4 | 5 | 6 | 7 | 1 |
| Chicken fat (250) | LV.4 | LV.4 | LV.4 | LV.4 | LV.4 | LV.5 | LV.5 | LV.1 |
| Chicken fat (285) | LV.4 | LV.4 | LV.4 | LV.4 | LV.4 | LV.4 | LV.4 | LV.1 |
| Olive oil (250) | LV.5 | LV.5 | LV.5 | LV.5 | LV.5 | LV.5 | LV.5 | LV.1 |
| Olive oil (285) | LV.3 | LV.3 | LV.3 | LV.3 | LV.3 | LV.4 | LV.4 | LV.1 |

It could be seen that the enamel compositions of each of the Examples achieved significant improvement in cleaning performance resulting from suitable distribution of the metal oxide catalyst on the surface of the coating layer. On the other hand, it could be seen that the enamel composition of the Comparative Example free from the metal oxide catalyst had insufficient cleaning performance as compared with the enamel compositions of the Examples.

Although some exemplary embodiments have been described, it should be understood that the present disclosure is not limited to these embodiments and that various modifications, changes, and alterations can be made by those skilled in the art without departing from the spirit and scope of the present disclosure. In addition, although advantageous effects provided by a certain configuration are not clearly described in description of the exemplary embodiments, it should be understood that expectable effects of the corresponding configuration should be acknowledged. The present disclosure provides an enamel composition that allows cleaning at room temperature without heating to high temperature and has good fouling resistance to allow easy removal of oil contaminants, such as chicken fat.

Aspects of the present disclosure provides an enamel composition that can optimize cleaning performance at low cost. Aspects of the present disclosure further provide a method of preparing an enamel composition, which allows easy application of a catalyst oxide contained in the enamel composition.

Aspects of the present disclosure are not limited to the above-mentioned aspects, and other aspects of the present disclosure which are not mentioned may be understood by the foregoing description and may be more clearly understood in view of the embodiments of the present disclosure. It will also be readily apparent that the aspects of the present disclosure may be implemented by features defined in claims and a combination thereof.

According to an example of the present disclosure, an enamel composition that allows cleaning at room temperature and has cleaning performance to allow easy removal of oil contaminants, such as chicken fat, may include: glass frit; and a metal oxide catalyst, wherein the metal oxide catalyst includes at least one selected from the group of a unary metal oxide and a binary metal oxide.

According to an example of the present disclosure, in order to provide an enamel composition capable of optimizing cleaning performance at low cost, the enamel composition may include: 90 wt % to 98 wt % of the glass frit and 2 wt % to 10 wt % of the metal oxide catalyst.

According to an example of the present disclosure, a method of preparing an enamel composition may include: preparing glass frit; preparing a metal oxide catalyst including at least one selected from the group of a unary metal oxide and a binary metal oxide; and mixing the glass frit with the metal oxide catalyst.

According to an example of the present disclosure, the enamel composition may include the glass frit and the metal oxide catalyst, thereby allowing for improved cleaning at room temperature without heating to relatively higher temperature while exhibiting good fouling resistance to realize good cleaning performance through easy removal of oil contaminants, such as chicken fat. In addition, according to an example of the present disclosure, the enamel composition includes a small amount of catalyst, thereby optimizing cleaning performance at low cost. Further, according to an example of the present disclosure, the enamel composition having good effects can be prepared through a convenient method by mixing the glass frit with the metal oxide catalyst.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

1: cooking device;
11: cavity;
12: cooking chamber;
13: convection assembly;
14: door;
15: upper heater;
16: lower heater; and
17, 18: coating layer.

What is claimed is:

1. An enamel composition comprising:
    glass frit; and
    a metal oxide catalyst,
    wherein the metal oxide catalyst includes a binary metal oxide,
    wherein the binary metal oxide includes at least one selected from a group of a Cu—Mo alloy metal oxide and a Bi—Mo alloy metal oxide.

2. The enamel composition according to claim 1, comprising:
    90 wt % to 98 wt % of the glass frit; and
    2 wt % to 10 wt % of the metal oxide catalyst.

3. The enamel composition according to claim 1, wherein the glass frit includes 15 wt % to 40 wt % of $SiO_2$.

4. The enamel composition according to claim 3, wherein the glass frit further includes 15 wt % to 40 wt % of $B_2O_3$.

5. The enamel composition according to claim 4, wherein the glass frit further includes:
    8 wt % to 20 wt % of $Na_2O$,
    3 wt % to 10 wt % of $K_2O$, and
    1 wt % to 3 wt % of $Li_2O$.

6. The enamel composition according to claim 5, wherein the glass frit further includes:
    15 wt % to 40 wt % of ZnO,
    1 wt % to 5 wt % of NaF,
    2 wt % to 6 wt % of $Co_3O_4$, and
    0.5 wt % to 3 wt % of NiO.

7. A method of preparing an enamel composition, comprising:
    preparing glass frit;
    preparing a metal oxide catalyst including a binary metal oxide; and
    mixing the glass frit with the metal oxide catalyst,
    wherein the binary metal oxide includes at least one selected from a group of a Cu—Mo alloy metal oxide and a Bi—Mo alloy metal oxide.

8. The method of preparing that enamel composition according to claim 7, wherein preparing the glass frit includes:
    melting glass frit materials; and
    quenching the melted glass frit materials to form the glass frit.

9. The method of preparing the enamel composition according to claim 7, wherein preparing the metal oxide catalyst includes:
    heating the selected two metal oxides at 500° C. to 1,500° C.; and
    cooling the heated selected two metal oxides.

10. The method of preparing the enamel composition according to claim 7, wherein mixing the glass frit with the metal oxide catalyst includes mixing 90 wt % to 98 wt % of the glass frit with 2 wt % to 10 wt % of the metal oxide catalyst.

11. The method of preparing the enamel composition according to claim 7, wherein the glass frit includes 15 wt % to 40 wt % of $SiO_2$.

12. The method of preparing the enamel composition according to claim 11, wherein the glass frit further includes 15 wt % to 40 wt % of $B_2O_3$.

13. The method of preparing the enamel composition according to claim 12, wherein the glass frit further includes:
    8 wt % to 20 wt % of $Na_2O$,
    3 wt % to 10 wt % of $K_2O$, and
    1 wt % to 3 wt % of $Li_2O$.

14. The method of preparing the enamel composition according to claim 13, wherein the glass frit further includes:
    15 wt % to 40 wt % of ZnO,
    1 wt % to 5 wt % of NaF,
    2 wt % to 6 wt % of $Co_3O_4$, and
    0.5 wt % to 3 wt % of NiO.

15. A cooking device comprising:
    a cavity defining a cooking chamber;
    a door selectively opening and closing the cooking chamber;
    at least one heating source that supplies heat to the cooking chamber; and
    a coating layer formed by providing a coating layer of the enamel composition according to claim 1 on at least one of an inner surface of the cavity or an inner surface of the door.

* * * * *